(12) United States Patent
Liu et al.

(10) Patent No.: US 10,573,014 B2
(45) Date of Patent: Feb. 25, 2020

(54) IMAGE PROCESSING SYSTEM AND LENS STATE DETERMINATION METHOD

(71) Applicant: VIVOTEK INC., New Taipei (TW)

(72) Inventors: Cheng-Chieh Liu, New Taipei (TW); Chao-Ming Chang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 212 days.

(21) Appl. No.: 15/925,782

(22) Filed: Mar. 20, 2018

(65) Prior Publication Data

US 2018/0286064 A1 Oct. 4, 2018

(30) Foreign Application Priority Data

Mar. 30, 2017 (TW) .............................. 106110792 A

(51) Int. Cl.
*G06T 7/55* (2017.01)
*G06T 7/80* (2017.01)
*H04N 7/18* (2006.01)
*G08B 13/196* (2006.01)
*G06T 7/593* (2017.01)
*G06T 7/00* (2017.01)

(52) U.S. Cl.
CPC .............. *G06T 7/55* (2017.01); *G06T 7/0002* (2013.01); *G06T 7/593* (2017.01); *G06T 7/80* (2017.01); *G08B 13/19613* (2013.01); *G08B 13/19617* (2013.01); *G08B 13/19671* (2013.01); *H04N 7/183* (2013.01); *G06T 2207/10012* (2013.01); *G06T 2207/10028* (2013.01); *G06T 2207/20072* (2013.01); *G06T 2207/30168* (2013.01)

(58) Field of Classification Search
None
See application file for complete search history.

(56) References Cited

U.S. PATENT DOCUMENTS

| 2012/0242796 A1* | 9/2012 | Ciurea | H04N 5/23212 348/46 |
| 2014/0267243 A1* | 9/2014 | Venkataraman | G06T 7/557 345/419 |
| 2015/0015673 A1* | 1/2015 | Matono | G01C 11/06 348/47 |

FOREIGN PATENT DOCUMENTS

| CN | 102280005 A | 12/2011 |
| CN | 104580878 A | 4/2015 |
| CN | 105139401 A | 12/2015 |

* cited by examiner

*Primary Examiner* — David Perlman
(74) *Attorney, Agent, or Firm* — Winston Hsu

(57) ABSTRACT

An image processing system includes a dual lens module and a processor. The dual lens module captures a pair of images. The processor generates a depth map of the pair of images. The processor generates a pixel depth distribution histogram according to the depth map. The processor calculates a pixel depth mean and a pixel depth variance according to the pixel depth distribution histogram. The processor determines whether the pixel depth mean is within a distance range and determines whether the pixel depth variance is smaller than a first threshold or larger than a second threshold, so as to determine that the dual lens module is situated in a normal state or an abnormal state.

10 Claims, 5 Drawing Sheets

IMAGE PROCESSING SYSTEM AND LENS STATE DETERMINATION METHOD

BACKGROUND OF THE INVENTION

1. Field of the Invention

The invention relates to an image processing system and a lens state determination method and, more particularly, to an image processing system and a lens state determination method capable of determining a lens state in time.

2. Description of the Prior Art

Since safety awareness is being raised gradually, people pay much attention to safety surveillance application. So far in many public or non-public places, there are always one or more cameras installed for safety surveillance. However, once a lens of the camera is blocked or destroyed, the camera cannot capture normal surveillance image. In the prior art, the lens state of the camera is inspected by manpower only. If we cannot discover the lens of the camera has been blocked or destroyed in time, the safety may be anxious.

SUMMARY OF THE INVENTION

An objective of the invention is to provide an image processing system and a lens state determination method capable of determining a lens state in time, so as to solve the aforesaid problems.

According to an embodiment of the invention, an image processing system comprises a dual lens module and a processor, wherein the processor is coupled to the dual lens module. The dual lens module captures a pair of images. The processor generates a depth map of the pair of images. The processor generates a pixel depth distribution histogram according to the depth map. The processor calculates a pixel depth mean and a pixel depth variance according to the pixel depth distribution histogram. The processor determines whether the pixel depth mean is within a distance range and determines whether the pixel depth variance is smaller than a first threshold or larger than a second threshold. The processor determines that the dual lens module is situated in a normal state when the pixel depth mean is within the distance range and the pixel depth variance is smaller than the first threshold. The processor determines that the dual lens module is situated in an abnormal state when the pixel depth mean is beyond the distance range and the pixel depth variance is larger than the second threshold.

According to another embodiment of the invention, a lens state determination method is applied to an image processing system. The image processing system comprises a dual lens module and a processor, wherein the processor is coupled to the dual lens module. The lens state determination method comprises steps of the dual lens module capturing a pair of images; the processor generating a depth map of the pair of images; the processor generating a pixel depth distribution histogram according to the depth map; the processor calculating a pixel depth mean and a pixel depth variance according to the pixel depth distribution histogram; the processor determining whether the pixel depth mean is within a distance range and determining whether the pixel depth variance is smaller than a first threshold or larger than a second threshold; the processor determining that the dual lens module is situated in a normal state when the pixel depth mean is within the distance range and the pixel depth variance is smaller than the first threshold; and the processor determining that the dual lens module is situated in an abnormal state when the pixel depth mean is beyond the distance range and the pixel depth variance is larger than the second threshold.

As mentioned in the above, after the dual lens module captures a pair of images, the invention generates the depth map of the pair of images, generates the pixel depth distribution histogram according to the depth map, and calculates the pixel depth mean and the pixel depth variance according to the pixel depth distribution histogram. Then, the image processing system can utilize the pixel depth mean and the pixel depth variance to determine that the dual lens module is situated in the normal state or the abnormal state in time. When determining that the dual lens module is situated in the abnormal state, it means the dual lens module may have been blocked or destroyed. The image processing system may further send out an alarm message to warn relevant people.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
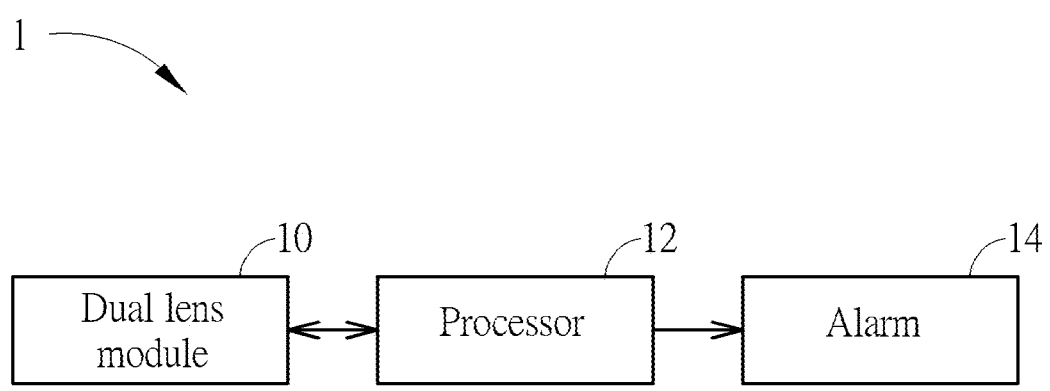
FIG. 1 is a functional block diagram illustrating an image processing system according to an embodiment of the invention.
Figure 2:
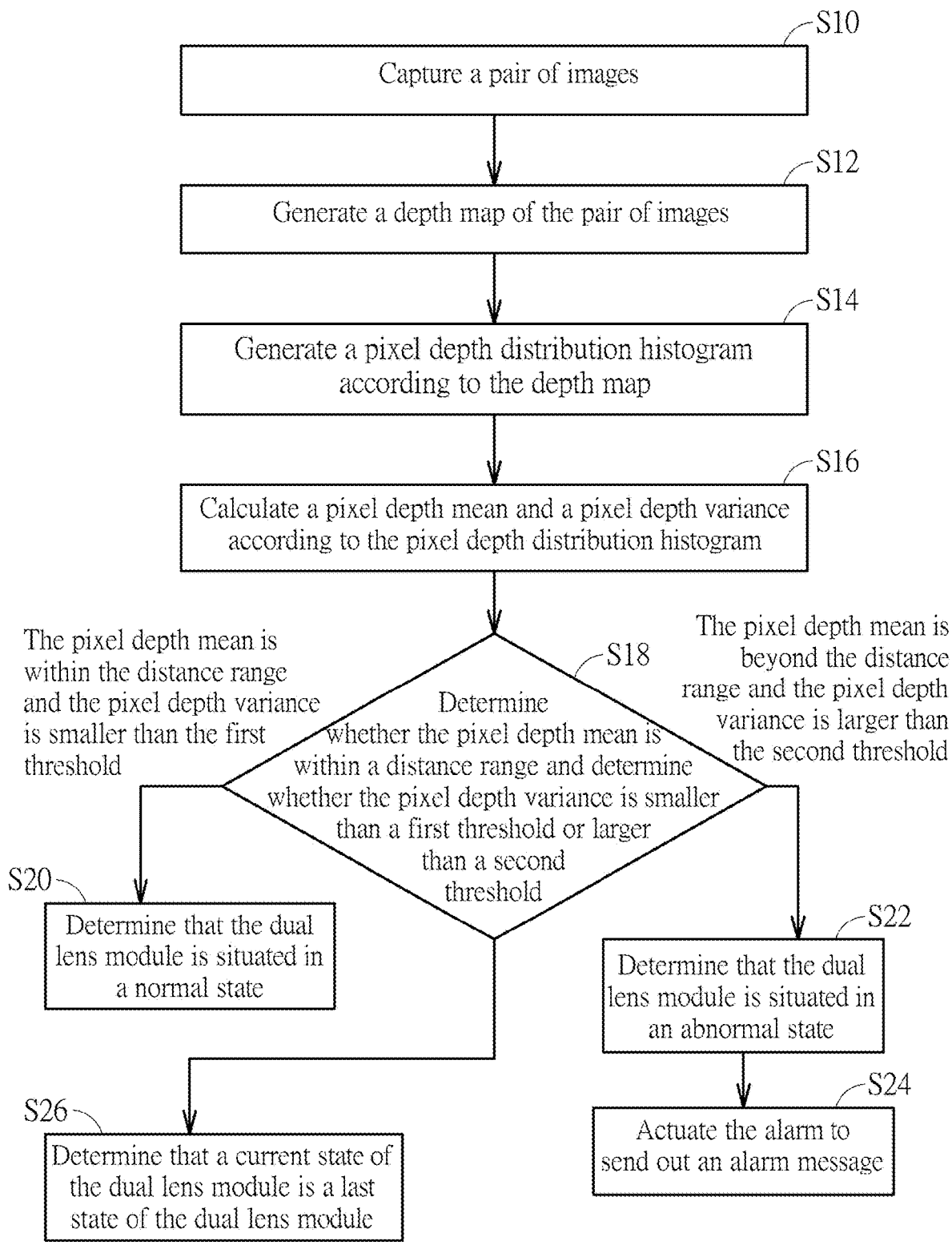
FIG. 2 is a flowchart illustrating a lens state determination method according to an embodiment of the invention.
Figure 3:
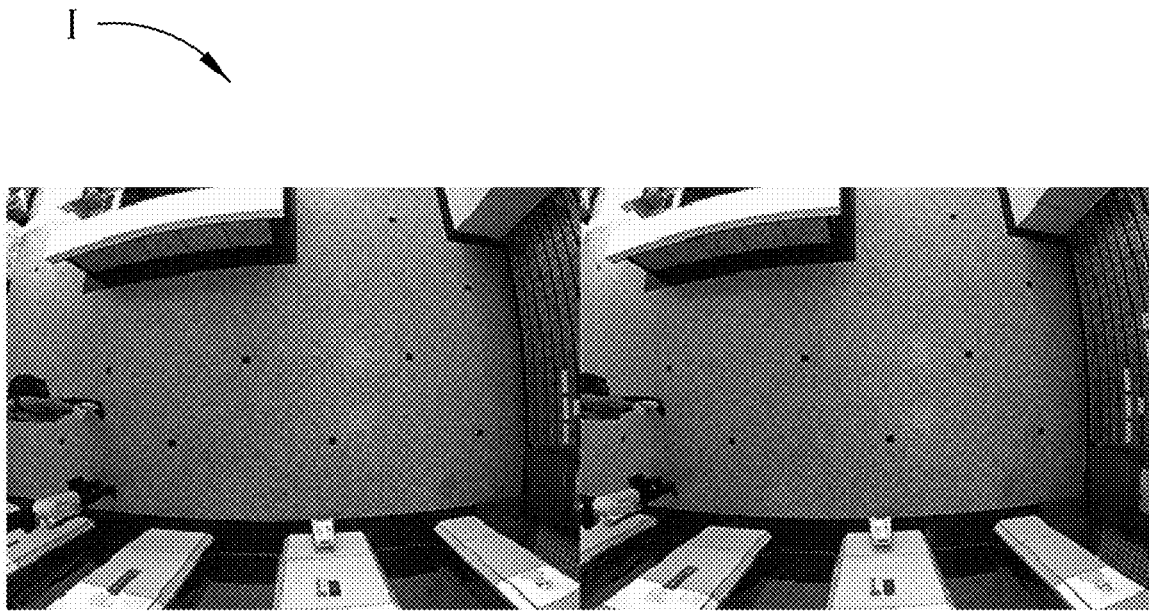
FIG. 3 is a schematic view illustrating an image.
Figure 4:
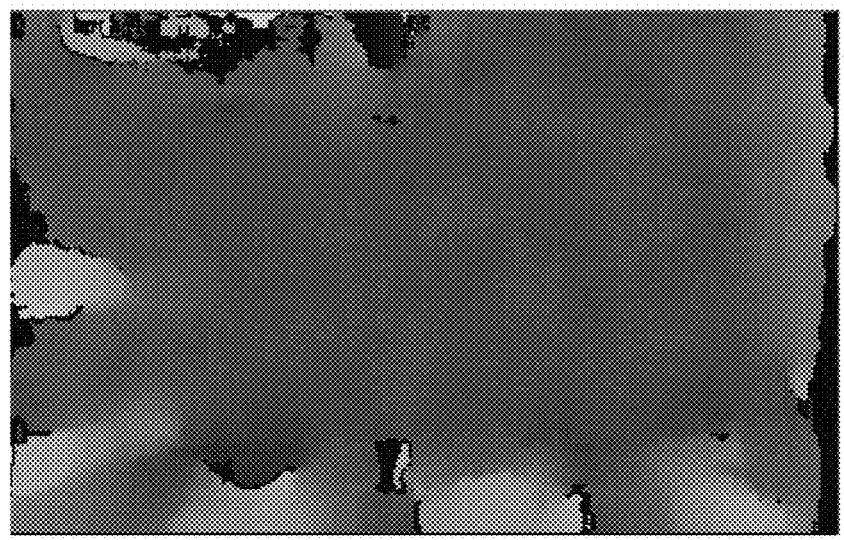
FIG. 4 is a schematic view illustrating a depth map generated according to the image shown in FIG. 3.

Referring to FIGS. 1 to 4, FIG. 1 is a functional block diagram illustrating an image processing system 1 according to an embodiment of the invention, FIG. 2 is a flowchart illustrating a lens state determination method according to an embodiment of the invention, FIG. 3 is a schematic view illustrating an image I, and FIG. 4 is a schematic view illustrating a depth map generated according to the image I shown in FIG. 3. The lens state determination method shown in FIG. 2 may be applied to the image processing system 1 shown in FIG. 1.

As shown in FIG. 1, the image processing system 1 comprises a dual lens module 10, a processor 12 and an alarm 14, wherein the processor 12 is coupled to the dual lens module 10 and the alarm 14. In this embodiment, the image processing system 1 may essentially consist of a camera, wherein the dual lens module 10, the processor 12 and the alarm 14 maybe disposed in the camera. In another embodiment, the image processing system 1 may essentially consist of a camera and a computer, both communicate with each other through a network, such as wired or wireless network, local area network (LAN), Internet, and so on, wherein the dual lens module 10 may be disposed in the camera, the processor may be disposed in the computer, and the alarm 14 may be selectively disposed in the camera or the computer. Furthermore, the aforesaid camera may be a depth camera or a stereo camera. In this embodiment, the processor 12 may be a processor or a controller with data processing/calculating function. In general, the image processing system 1 may be further equipped with some necessary hardware or software components for specific purposes, such as a circuit board, a power supply, applications, a communication module, etc., and it depends on practical applications.

The dual lens module 10 is configured to capture a pair of images (i.e. left-eye and right-eye images), as the image I shown in FIG. 3. Then, the processor 12 can generate a depth map (as shown in FIG. 4) according to the image I (as shown in FIG. 3). Then, the processor 12 can generate a pixel depth distribution histogram according to the depth values of all pixels in the depth map and calculate a pixel depth mean and a pixel depth variance according to the pixel depth distribution histogram. Then, the processor 12 can utilize the pixel depth mean and the pixel depth variance to determine that the dual lens module is situated in a normal state or an abnormal state in time.

Figure 5:
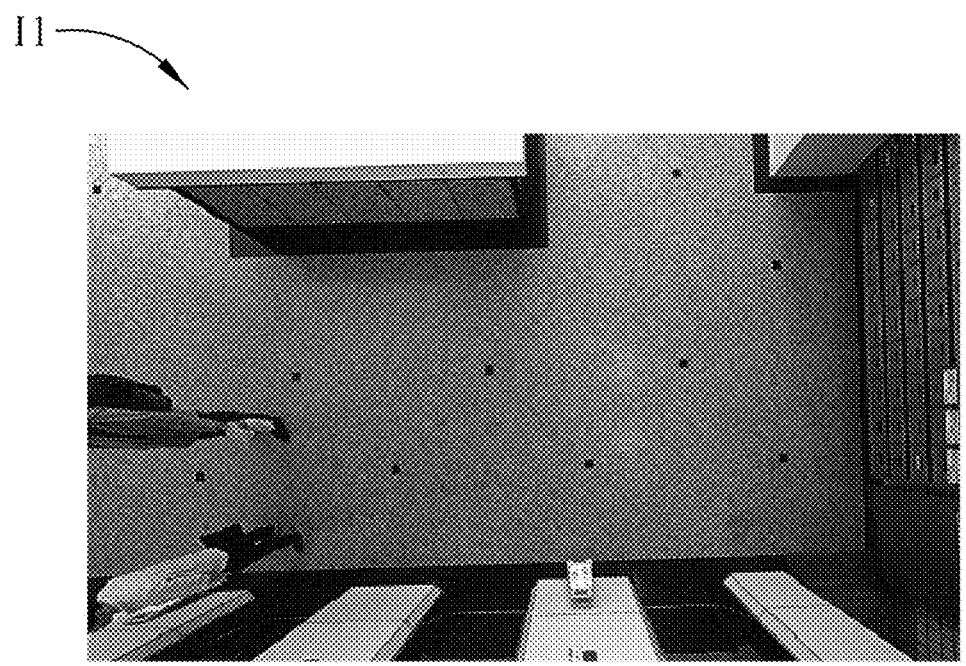
FIG. 5 is a schematic view illustrating an image.
Figure 6:
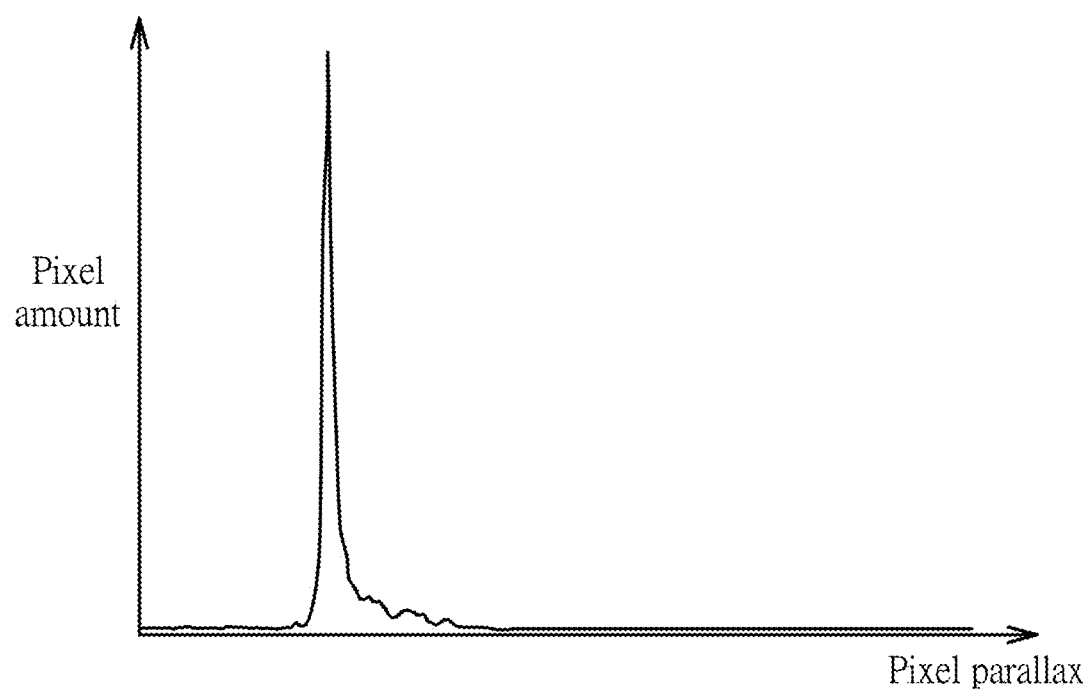
FIG. 6 is a schematic diagram illustrating a pixel depth distribution histogram generated according to the image shown in FIG. 5.
Figure 7:
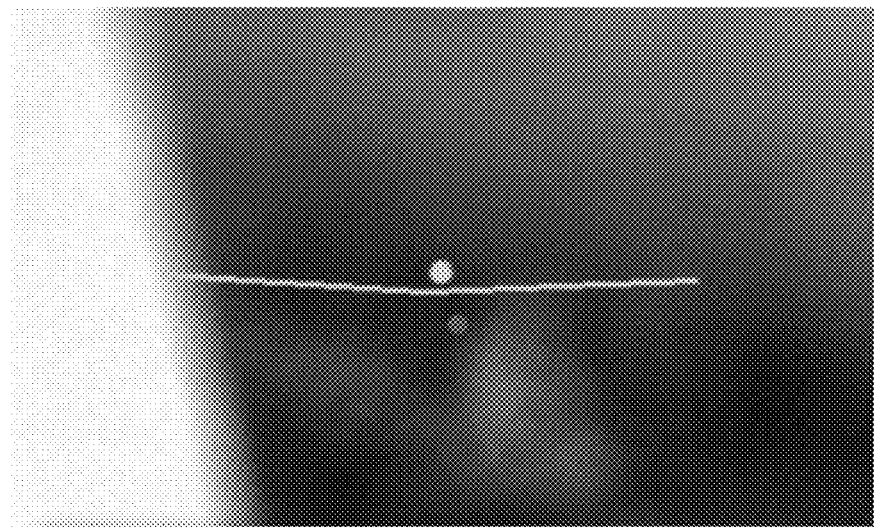
FIG. 7 is a schematic view illustrating an image.
Figure 8:
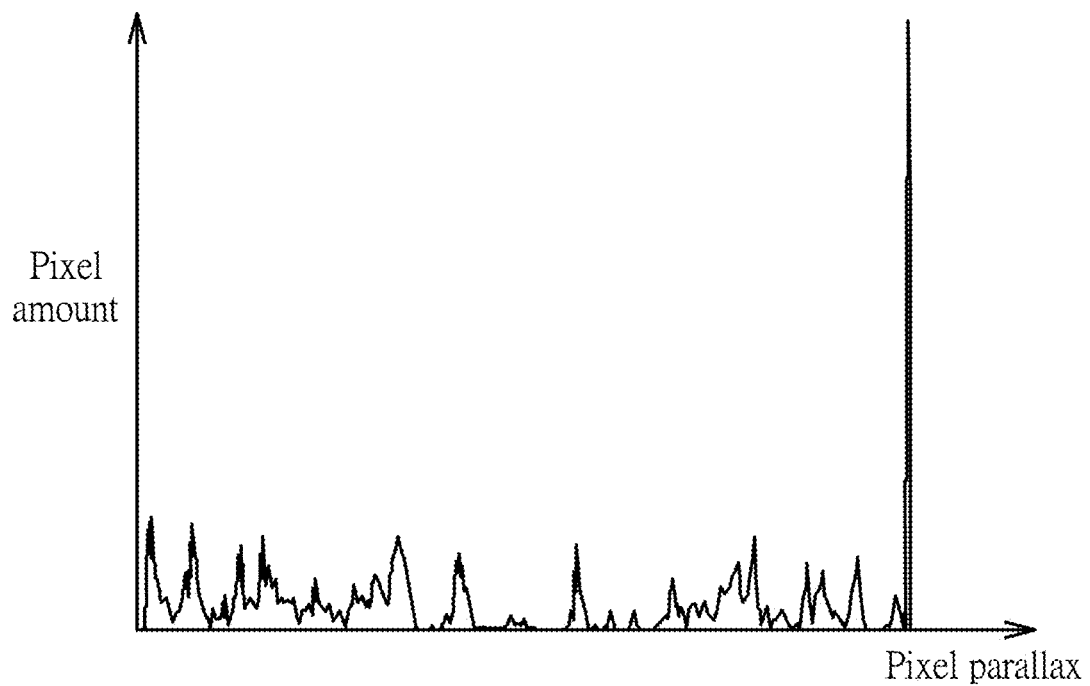
FIG. 8 is a schematic diagram illustrating a pixel depth distribution histogram generated according to the image shown in FIG. 7.

Referring to FIGS. 5 to 8, FIG. 5 is a schematic view illustrating an image I1, FIG. 6 is a schematic diagram illustrating a pixel depth distribution histogram generated according to the image I1 shown in FIG. 5, FIG. 7 is a schematic view illustrating an image I2, and FIG. 8 is a schematic diagram illustrating a pixel depth distribution histogram generated according to the image I2 shown in FIG. 7.

The features of the invention are depicted in the following with the flowchart shown in FIG. 2 and FIGS. 5-8. First of all, the dual lens module 10 captures a pair of images (step S10). It should be noted that the image I1 is captured by the dual lens module 10 in the normal state and the image I2 is captured by the dual lens module 10 in the abnormal state, wherein the image I1 is obtained by rectifying a pair of images captured by the dual lens module 10 and the image I2 is obtained by rectifying a pair of images captured by the dual lens module 10.

Then, the processor 12 generates a depth map of each image I1, I2 (step S12), wherein the depth map is rendered as FIG. 4.

Then, the processor 12 generates a pixel depth distribution histogram according to the depth map (step S14), wherein the pixel depth distribution histogram corresponding to the depth map of the image I1 is shown in FIG. 6 and the pixel depth distribution histogram corresponding to the depth map of the image I2 is shown in FIG. 8. It should be noted that the pixel depth distribution histogram does not comprise depth information of invalid pixels. The invalid pixel means a pixel with a depth value equal to 0. If a pixel with a depth value equal to 0, it means that a distance between the corresponding space of the pixel and the camera is infinite.

Then, the processor 12 calculates a pixel depth mean and a pixel depth variance according to the pixel depth distribution histogram (step S16). It is assumed that the processor 12 calculates a pixel depth mean M1 and a pixel depth variance V1 according to the pixel depth distribution histogram shown in FIG. 6 and the processor 12 calculates a pixel depth mean M2 and a pixel depth variance V2 according to the pixel depth distribution histogram shown in FIG. 8.

Then, the processor 12 determines whether the pixel depth mean M1, M2 is within a distance range and determines whether the pixel depth variance V1, V2 is smaller than a first threshold or larger than a second threshold (step S18). In this embodiment, the distance range may comprise an upper bound and a lower bound, wherein the upper bound may be an installation height of the dual lens module 10 relative to a ground, and the lower bound may be a predetermined distance. For example, if the installation height of the dual lens module 10 relative to the ground is 300 cm, the upper bound of the distance range is 300 cm. If a distance between an object and the dual lens module 10 is smaller than 30 cm when the dual lens module 10 is blocked by the object, the lower bound of the distance range maybe set as 30 cm. Furthermore, the first threshold may be set according to the sensitivity of the dual lens module 10 and the second threshold may be set according to the installation height of the dual lens module 10.

When the processor 12 determines that the pixel depth mean is within the distance range and the pixel depth variance is smaller than the first threshold, the processor 12 determines that the dual lens module 10 is situated in the normal state (step S20). Since the image I1 shown in FIG. 5 is captured by the dual lens module 10 in the normal state, the pixel depth mean generated according to the depth map of the image I1 is within the distance range and the pixel depth variance generated according to the depth map of the image I1 is smaller than the first threshold accordingly. Therefore, when the dual lens module 10 captures the image I1 shown in FIG. 5, the processor 12 determines that the dual lens module 10 is situated in the normal state.

When the processor 12 determines that the pixel depth mean is beyond the distance range and the pixel depth variance is larger than the second threshold, the processor 12 determines that the dual lens module 10 is situated in the abnormal state (step S22). Since the image I2 shown in FIG. 7 is captured by the dual lens module 10 in the abnormal state, the pixel depth mean generated according to the depth map of the image I2 is beyond the distance range and the pixel depth variance generated according to the depth map of the image I2 is larger than the second threshold accordingly. Therefore, when the dual lens module 10 captures the image I2 shown in FIG. 7, the processor 12 determines that the dual lens module 10 is situated in the abnormal state.

When the processor 12 determines that the dual lens module 10 is situated in the abnormal state, it means the dual lens module 10 may have been blocked or destroyed. At this time, the processor 12 may actuate the alarm 14 to send out an alarm message (step S24) to warn relevant people. The alarm message may be light, sound, image, text or the combination thereof according to practical applications.

It should be noted that except the aforesaid situation, the processor 12 may determine that a current state of the dual lens module 10 is a last state of the dual lens module 10 (step S26). It is assumed that the last state of the dual lens module 10 is the normal state. When the processor 12 determines that the pixel depth variance is between the first threshold and the second threshold, the processor 12 still determines that the current state of the dual lens module 10 is the normal state. It is assumed that the last state of the dual lens module 10 is the abnormal state. When the processor 12 determines that the pixel depth variance is between the first threshold and the second threshold, the processor 12 still determines that the current state of the dual lens module 10 is the abnormal state. It should be noted that no matter whether the dual lens module 10 has been blocked or destroyed before the system is actuated, the state of the dual lens module 10 may be set as the normal state, the abnormal state or an unknown state when the system is actuated. If the state of the dual lens module 10 is set as the unknown state when the system is actuated and the system determines that the pixel depth variance is between the first threshold and the second threshold first time after the system is actuated, the processor 12 will determine that the current state of the dual lens module 10 is still the unknown state.

As mentioned in the above, after the dual lens module captures a pair of images, the invention generates the depth map of the pair of images, generates the pixel depth distribution histogram according to the depth map, and calculates the pixel depth mean and the pixel depth variance according to the pixel depth distribution histogram. Then, the image processing system can utilize the pixel depth mean and the pixel depth variance to determine that the dual lens module is situated in the normal state or the abnormal state in time. When determining that the dual lens module is situated in the abnormal state, it means the dual lens module may have been blocked or destroyed. The image processing system may further send out an alarm message to warn relevant people.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing system comprising:
    a dual lens module capturing a pair of images; and
    a processor coupled to the dual lens module, the processor generating a depth map of the pair of images, the processor generating a pixel depth distribution histogram according to the depth map, the processor calculating a pixel depth mean and a pixel depth variance according to the pixel depth distribution histogram, the processor determining whether the pixel depth mean is within a distance range and determining whether the pixel depth variance is smaller than a first threshold or larger than a second threshold, the processor determining that the dual lens module is situated in a normal state when the pixel depth mean is within the distance range and the pixel depth variance is smaller than the first threshold, the processor determining that the dual lens module is situated in an abnormal state when the pixel depth mean is beyond the distance range and the pixel depth variance is larger than the second threshold.

2. The image processing system of claim 1, wherein the distance range comprises an upper bound and a lower bound, the upper bound is an installation height of the dual lens module relative to a ground, and the lower bound is a predetermined distance.

3. The image processing system of claim 1, wherein the pixel depth distribution histogram does not comprise depth information of invalid pixels.

4. The image processing system of claim 1, wherein when the pixel depth variance is between the first threshold and the second threshold, the processor determines that a current state of the dual lens module is a last state of the dual lens module.

5. The image processing system of claim 1, further comprising an alarm coupled to the processor, wherein when the processor determines that the dual lens module is situated in the abnormal state, the processor actuates the alarm to send out an alarm message.

6. A lens state determination method applied to an image processing system, the image processing system comprising a dual lens module and a processor, the processor being coupled to the dual lens module, the lens state determination method comprising steps of:
    the dual lens module capturing a pair of images;
    the processor generating a depth map of the pair of images;
    the processor generating a pixel depth distribution histogram according to the depth map;
    the processor calculating a pixel depth mean and a pixel depth variance according to the pixel depth distribution histogram;
    the processor determining whether the pixel depth mean is within a distance range and determining whether the pixel depth variance is smaller than a first threshold or larger than a second threshold;
    the processor determining that the dual lens module is situated in a normal state when the pixel depth mean is within the distance range and the pixel depth variance is smaller than the first threshold; and
    the processor determining that the dual lens module is situated in an abnormal state when the pixel depth mean is beyond the distance range and the pixel depth variance is larger than the second threshold.

7. The lens state determination method of claim 6, wherein the distance range comprises an upper bound and a lower bound, the upper bound is an installation height of the dual lens module relative to a ground, and the lower bound is a predetermined distance.

8. The lens state determination method of claim 6, wherein the pixel depth distribution histogram does not comprise depth information of invalid pixels.

9. The lens state determination method of claim 6, further comprising step of:
    when the pixel depth variance is between the first threshold and the second threshold, the processor determining that a current state of the dual lens module is a last state of the dual lens module.

10. The lens state determination method of claim 6, wherein the image processing system further comprises an alarm coupled to the processor and the lens state determination method further comprises step of:
    when the processor determines that the dual lens module is situated in the abnormal state, the processor actuating the alarm to send out an alarm message.

* * * * *